United States Patent
Andrianiaina et al.

(10) Patent No.: US 9,164,796 B2
(45) Date of Patent: Oct. 20, 2015

(54) ROBUST SYSTEM CONTROL METHOD WITH SHORT EXECUTION DEADLINES

(75) Inventors: Patrick Andrianiaina, Toulouse (FR); Alexandre Seuret, Toulouse (FR); Daniel Simon, St Martin de Loudres (FR)

(73) Assignee: AIRBUS OPERATIONS SAS, Toulouse (FR)

(*) Notice: Subject to any disclaimer, the term of this patent is extended or adjusted under 35 U.S.C. 154(b) by 238 days.

(21) Appl. No.: 13/603,206

(22) Filed: Sep. 4, 2012

(65) Prior Publication Data

US 2013/0219402 A1  Aug. 22, 2013

(30) Foreign Application Priority Data

Sep. 6, 2011  (EP) .................................... 11306103

(51) Int. Cl.
| | |
|---|---|
| G06F 9/46 | (2006.01) |
| G06F 9/50 | (2006.01) |
| G05B 19/042 | (2006.01) |
| G06F 9/48 | (2006.01) |
| G06F 11/00 | (2006.01) |

(52) U.S. Cl.
CPC .............. *G06F 9/50* (2013.01); *G05B 19/0426* (2013.01); *G06F 9/4887* (2013.01); *G06F 11/008* (2013.01)

(58) Field of Classification Search
CPC ....... G06F 9/52; G06F 9/5016; G06F 9/5077; G06F 9/4881; G06F 9/4843; G06F 9/50; G06F 9/4887; G06F 11/008; G05B 19/0426
See application file for complete search history.

(56) References Cited

U.S. PATENT DOCUMENTS

| | | | | |
|---|---|---|---|---|
| 5,887,143 | A * | 3/1999 | Saito et al. .................... | 709/248 |
| 6,317,874 | B1 | 11/2001 | Prasanna | |
| 6,438,573 | B1 * | 8/2002 | Nilsen .......................... | 718/100 |
| 7,140,022 | B2 * | 11/2006 | Binns ........................... | 718/105 |
| 7,302,685 | B2 * | 11/2007 | Binns et al. .................. | 718/103 |
| 7,788,667 | B2 * | 8/2010 | Jiang ........................... | 718/102 |
| 8,316,368 | B2 * | 11/2012 | Vestal et al. ................. | 718/102 |
| 8,473,563 | B2 * | 6/2013 | Jiang ........................... | 709/208 |

(Continued)

FOREIGN PATENT DOCUMENTS

| | | |
|---|---|---|
| DE | 10 2004 051 967 | 6/2005 |
| EP | 1 544 716 | 2/2004 |
| WO | 2009/127646 | 10/2009 |

OTHER PUBLICATIONS

European Search Report dated Jun. 12, 2012.

*Primary Examiner* — Van Nguyen
(74) *Attorney, Agent, or Firm* — Dickinson Wright PLLC

(57) ABSTRACT

A method of controlling a system includes the steps of launching a task having associated therewith a worst case execution time, and monitoring the end of the task after the end of a time slot allocated to the execution of the task, wherein the time slot is shorter than the worst case execution time. The task may be launched periodically according to a fixed period of time, and when the execution of the task ends before the allocated time slot, the method may further include outputting a value calculated based on a current input value but when the execution of the task does not end before the allocated time slot, the method may further include outputting a value calculated based on a previous input value and stopping the task and launching the task again at the next period of time with a next input value.

14 Claims, 9 Drawing Sheets

(56) References Cited

U.S. PATENT DOCUMENTS

| | | | |
|---|---|---|---|
| 8,543,366 B2* | 9/2013 | Pree et al. | 703/13 |
| 2002/0120661 A1* | 8/2002 | Binns et al. | 709/102 |
| 2005/0015767 A1* | 1/2005 | Nash et al. | 718/102 |
| 2008/0028415 A1* | 1/2008 | Binns et al. | 718/107 |
| 2008/0162989 A1 | 7/2008 | Weiberle | |
| 2008/0282246 A1* | 11/2008 | Dolev et al. | 718/102 |
| 2011/0010160 A1* | 1/2011 | Pree et al. | 703/21 |
| 2011/0271127 A1 | 11/2011 | Thabet | |

* cited by examiner

ROBUST SYSTEM CONTROL METHOD WITH SHORT EXECUTION DEADLINES

The present invention relates to the control of critical automatic systems. The present invention has applications in robust automatic systems for which stability is a critical issue such as avionics systems.

Critical security products, such as avionics products, are generally developed under strict safety regulations. These safety regulations include determinism and predictability of the systems' timing behaviour. Typically, the overall development approach is based on a separation of control design and implementation concerns.

During the control design, an important issue is to keep constant sampling rates with equidistant samples and no jitter and to have negligible, or fixed and known, delays. Also, according to the real-time scheduling theory, it is mainly focused on dimensioning resources for meeting deadlines (or equivalently, on the schedule analysis for a given resource).

Typically, during operation, each resource of the system is allocated a time slot for responding to a solicitation. If the resource responds too late, the response is not taken into account. For example, considering a flight command, if a command is output by a pilot for acting on the engine power, a time slot is allocated to the engine power control system for applying the command to the engine. If the command is not applied before the end of the time slot, the control system may be considered as out of order and the overall security system of the aircraft may select an auxiliary engine power control system.

In the field of computer science and real-time scheduling, it is a main goal to implement these control tasks considering fixed periods and hard deadlines. These deadlines are usually chosen equal or greater than the "WCET" (acronym for Worst-Case Execution Time). The WCET must be precisely known in order to guarantee a safe operation of the systems.

This assumption has served the separation between control and scheduling designs, but leads to a non optimal use of computing resources (CPU resources) and such an approach faces technical, economical, and industrial challenges.

One of the toughest challenges in the prior art approach is the determination of the WCET needed for dimensioning the systems. The tightness of the result is related to the predictability of the processing unit.

The upcoming generations of processors seem to go apart from the predictability and determinism objectives of the execution time. Processing speeds and performances grow up very fast thanks to accelerating but unpredictable mechanisms of new processors but it becomes very difficult to foresee their effects on the execution time considered in the worst case. Nowadays, even if many attempts are proposed to determine an upper bound for the WCET, both the traditional and current approaches are difficult to apply to modern processor generations and produce values which are pessimistic, that is to say values which would cause the system to operate too conservatively.

Then, to implement the control laws, the hard and costly way of the prior art consists in building a highly deterministic system, from the hardware, operating system and communication protocols sides, so that the actual implementation parameters meet the ideal ones. By essence, implementations purely based on WCET and hard deadlines considerations are conservative, and lead to a non-optimal use of the computing and networking resources and finally lead to electrical supplies, cooling systems and weight oversizing.

Current real-time systems design methods and associated analysis tools do not provide a model flexible enough to fit well with control systems requirements. Also, classic control theory is silent about how to include resource and dependability constraints into the controller, both at the design and implementation stages.

In summary, in the prior art control techniques for automatic systems implement hard deadlines for the execution of control tasks and do not admit missing any deadline. Also the WCET approach does not allow an optimal use of the CPU resources since most of the time the task is able to output a result well before the WCET deadline (in other words, it is extremely infrequent that the tasks execution duration reaches the WCET).

Thus, there is a need for optimizing computer resources in critical automatic systems.

According to a first aspect of the invention there is provided a method of controlling a system comprising the following steps:

launching a task, said task being associated with a worst case execution time; and monitoring the end of the task after a time slot allocated to the execution of the task;

wherein said time slot is shorter than said worst case execution time.

Thus, it is not systematically waited for the worst case execution time (WCET) to elapse before checking whether a task has ended and before taking the following actions. This results in savings in terms of computing power.

Indeed, the WCET is almost always larger than the execution time, in particular for safety-critical applications. Therefore, in the vast majority of the task executions, the task ends well before the end of the WCET. The time between the end of the task and the end of the WCET corresponds to time during which the resources allocated to the execution of the task (such as processors) are not used.

The Inventors have found that this time can be reduced so that the computing resources may be optimized. This time may be used for executing other tasks thereby enhancing the processing efficiency of the system. The system may also be dimensioned with less computer resources thereby saving costs associated to redundant computing resources usually provided in the system as backup resources for the infrequent case wherein a failure of equipment is detected because it has carried out a task with an execution time longer than the WCET. Energy may also be saved in the system and the volume and the mass may also be reduced.

The Inventors found that the execution time slots allocated to the execution of the tasks in automatic systems may be shorter than the WCET while preserving the performances of the systems.

Indeed, as far as closed-loop control systems are considered, more flexible solutions can be implemented by exploiting the basic features of feedback loops, robustness with respect to modelling uncertainties, disturbance rejection and adaptability to various operative conditions. Robustness of feedback controllers also implies some fault-tolerance with respect to deviations from the ideal timing pattern, e.g. equidistant sampling. This feature can be efficiently used to guarantee the end-to-end control quality, i.e. stability and performance level, under weakened real-time constraints, therefore improving the overall computing power average utilization.

The inventors thus provide for a "weakened" (i.e. not as rigid as in the prior art wherein the WCET must be strictly respected) implementation scheme for real-time feedback controllers. The invention reduces the conservatism due to traditional worst-case considerations while preserving the stability and control performance of the system.

Based on a new approach for assessing stability of linear systems with delayed and sampled-data inputs, the invention takes into account the effects of missed deadlines by control tasks and uncertainties in the controlled system (or plant).

The invention "weakens" the real-time constraints and enables to save computing power while preserving the system's stability.

The worst case execution time may be determined during a preliminary statistical analysis if the task execution in the system. For example, the task is launch a given number of time and the execution time is monitored and stored. The condition of execution of the tasks may be varied in order to take into account bad and good conditions of operation of the system (for example simulations of hardware failures or software bugs). The highest execution time measured during the analysis thus corresponds to the worst case execution time.

A task may correspond to an instance of a computer program such as a computing process, for example a set of instructions to be executed by one or several processors for implementing a computing code. The task may also correspond to one or several computing threads.

According to embodiments, the task is launched periodically according to a fixed period of time.

Hence, the savings in terms of computing cycles are made on a regular basis thereby enhancing the overall optimization of the system.

For example, when the execution of the task ends before the allocated time slot, the method further comprises outputting a value calculated based on a current input value.

This may correspond to a regular case wherein the task has to output a command signal to an actuator, based on measurement values from sensors that have triggered the task execution.

According to another example, when the execution of the task does not end before the allocated time slot, the method further comprises outputting a value calculated based on a previous input value.

Thus, the system may still be in operation by holding the current command on the actuators. This is an alternative to the total deactivation of the processors executing the task when an execution time slot deadline is missed.

According to embodiments, the method further comprises stopping the task and launching the task again at the next period of time with a next input value.

The current value is thus ignored in order not to slow down the overall operation of the system.

According to embodiments, the time slot is determined so that a statistical maximum number of consecutive tasks, that do not end before the time slot, is below a performance threshold.

For example, the time slot is determined so that a probability for reaching a maximum number of consecutive tasks that do not end before the time slot is below a performance threshold.

Thus, the system designer may carry out a preliminary analysis of the system during which a trade-off is defined between robustness and resource optimization.

According to embodiments, the system has a feedback loop.

Such systems may be robust enough to easily allow for execution time slots shorter than the WCET. Such systems may also tolerate deadlines to be missed.

For example, the task corresponds to a command of an actuator of the system.

According to a second aspect of the invention, there are provided computer programs and computer program products comprising instructions for implementing a method according to the first aspect of the invention, when loaded and run on computer means of a control unit of a system. Computer readable means storing such computer programs are also provided.

According to a third aspect of the invention there is provided a system comprising a control unit configured to carry out a method according to the first aspect.

According to a fourth aspect of the invention, there is provided an aircraft command system comprising a system according to the third aspect.

According to a fifth aspect of the invention, there is provided an aircraft comprising a system according to the fourth aspect.

The objects according to the second, third, fourth and fifth aspects of the invention provide at least the same advantages as those provided by the method according the first aspect of the invention. The objects according to the third, fourth and fifth aspects of the invention may comprise means for implementing optional features of the method according to the first aspect.

Other features and advantages of the invention will become apparent from the following description of non-limiting exemplary embodiments, with reference to the appended drawings, in which.

The inventors have found that nowadays, the automatic control of systems theory have reached a robustness analysis level of confidence that allows for tolerating missed deadlines. The inventors have also found that the widespread WCET approach is far too cautious in most of the applications, even in safety critical applications. In what follows, there is described a method of controlling an automatic system with a time slot allocated to the execution of control tasks shorter that the WCET and that tolerates deadlines to be missed. It is also shown that stability and safety of the system may be guaranteed.

In what follows, for an n-dimensional state vector $x$ and a non-negative delay $h$, $x_t$ denotes a function such that $x_t(\theta)=x(t-\theta)$ for all $\theta \in [-h, 0]$. The set of such functions $x_t$ is denoted as $K^h$. The sets $R^+$, $R^{n \times n}$ and $S^n$ denote respectively the set of positive scalar, the set of n×n matrices and the set of symmetric matrices of $R^{n \times n}$. The superscript 'T' stands for the matrix transposition. The notation $P>0$ for $P \in S^n$ means that $P$ is positive definite. For any matrix $A \in R^{n \times n}$, the notation 2He{A}>0 refers to $A+A^T>0$. The symbols I and 0 represent the identity and the zero matrices of appropriate dimension.

Figure 1:
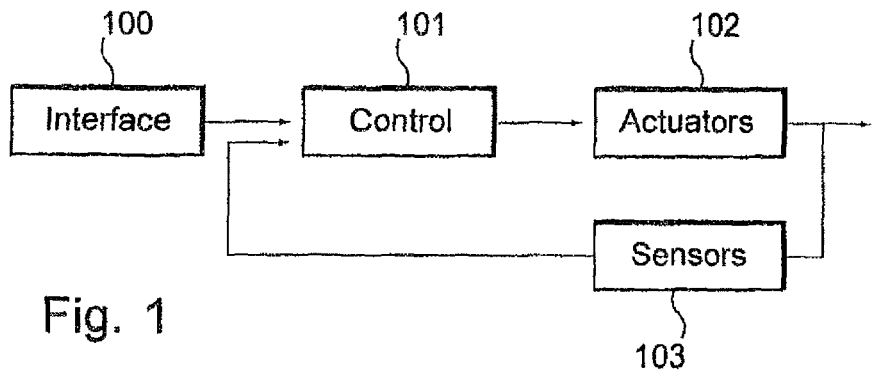
FIG. 1 is a schematic illustration of a general architecture of an automatic feedback control system.

FIG. 1 is a schematic illustration of a general architecture of an automatic feedback control system. This architecture may be implemented in various applications such as avionics, automotive, power plant control etc.

According to this architecture, the system has an interface unit 100 from which commands may be sent by a user or by another system. The interface may thus be a keypad, a touch screen or a communication interface. The interface unit outputs command signals to a control unit 101. The control unit then manages the command signal according to the state of the system and outputs control signals to a unit 102 comprising actuators of the system that perform the actions required by the command signals. A sensor unit 103 performs measurements in the system in order to provide the control unit with information enabling the control unit to determine the current state of the system.

In an avionic application, the actuators may be airbrakes, engines or other elements of an aircraft. The sensor unit may comprise speed sensors for example. The interface may be a cockpit lever.

Figure 2:
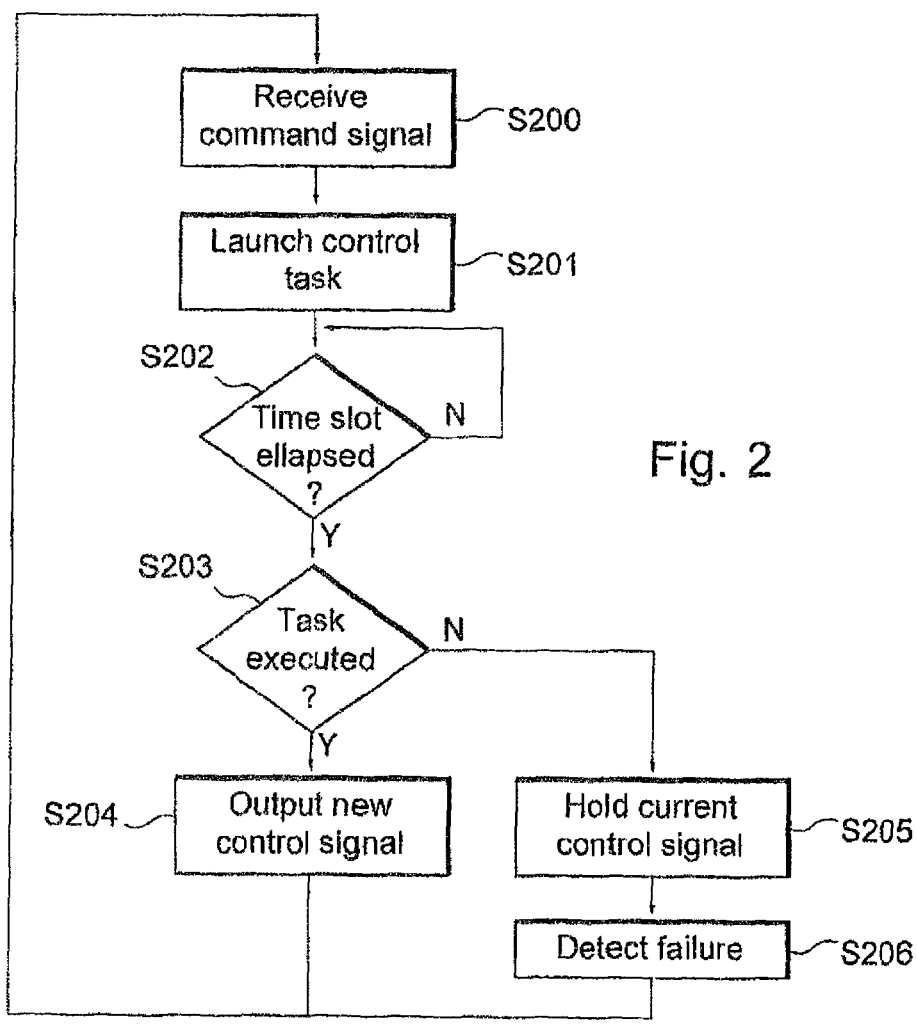
FIG. 2 is a flowchart of steps of a control method according to embodiments.

According to embodiments, the control unit may perform a method according to the general flowchart of FIG. 2.

During a step S200, the control unit receives a command signal. This step may be performed sequentially according to a time period. For example, the control unit monitors a communication port from which it receives command signal from the interface.

Next, during step S201, the control unit launches a task corresponding to the command signal. For example the task is a set of processes implemented by processors that perform calculations based on input values contained in the command signal.

Once the control task is launched, the control unit monitors the execution of the task, during step S202, by setting a timer to a time slot allocated to the execution of the task.

Once the time slot has elapsed, the control unit checks whether the task has been executed during step S203 by checking whether the task has output a result.

If the task has ended before the allocated time slot, then the control unit outputs a control signal during step S204. For example, the control signal feeds output values to an actuator of the system which have been calculated based on the input values received in the command signal.

If the task has not ended before the allocated time slot, then the control unit holds a current control signal during step S205. For example, the control signal feeds the actuator with the output values calculated based on input values received in the previous command signal for which the task has been previously launched.

In such a case, the control unit may detect a failure of an element of the control unit that performed the calculation for the execution of the task, for example a processor. The failure is detected during step S206. For example, when a failure is detected, the element (for example the processor) is deactivated and will not be further used until it has been checked. In such a case, the control unit has primary and auxiliary processors for performing the calculations. The primary processors are used in the normal case and the auxiliary processors are used in case of failure of the primary processors.

The deactivation may be carried out the first time a deadline is missed by the task or a counter may be set for deactivating the processor after a given number of missed deadlines.

After steps S204 and S206, the control unit goes back to step S200 according to the sequence time period as already mentioned above.

The time slot is determined based on a trade-off between the performance of the system and the optimization of the processor resources of the control unit as it will be shown hereafter. It is determined to be shorter than the WCET of the task.

Figure 3:
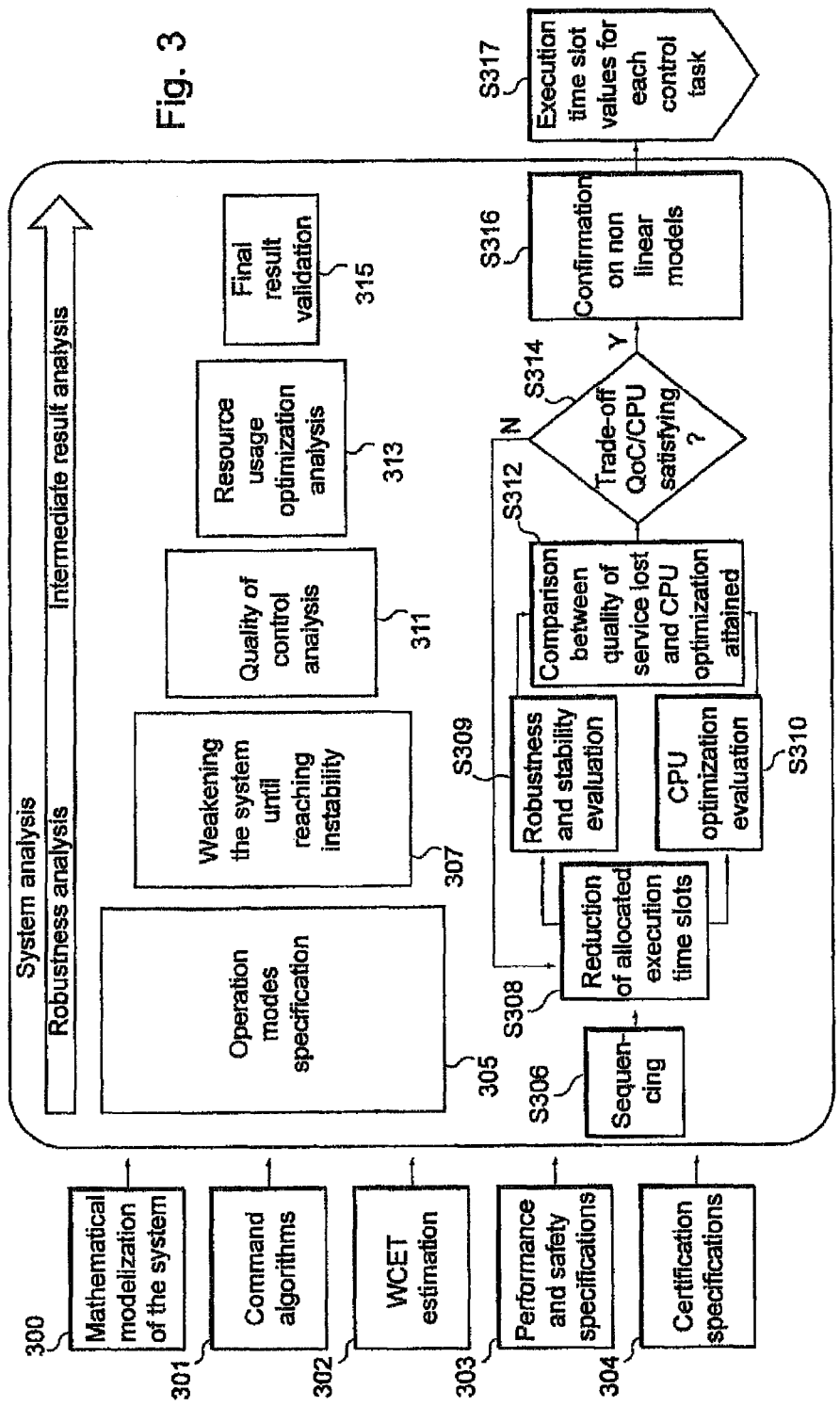
FIG. 3 is a schematic illustration of a procedure for selecting an execution time slot.

The overall procedure for selecting a time slot value is schematically represented in FIG. 3.

During preliminary procedures, the following elements are determined:
- The mathematical model of the system 300. The model is based on the physics of the system.
- The command algorithms 301 that are designed for operation of the system.
- The WCET estimation 302 based on statistical studies of the system. The system is operated a given number of times and the response time for the tasks is measured for determining the distribution of the response times measured.
- The performance and the safety specifications 303 the system has to meet given the applications envisaged.
- The certification specifications 304 the system has to comply with, for high level safety applications such as avionics applications.

Then, during a first sequence of analysis 305, the modes of operation are specified. During the sequence, the tasks to be executed by the system during the operation modes are sequenced (step S306). Each task is allocated execution time slots and the time slots are ordered according to the operation of the system.

During the next sequence 307, using the model 300, the system is weakened by shortening the execution time slots until the system reaches instability. The execution time slots allocated to the tasks are reduced below the respective WCETs given by item 302 during a step S308.

The resulting stability and robustness of the system are then evaluated during step S309 using items 300 and 301. In parallel, during step S310, the resulting gain in terms of computing resources for the system is evaluated. For example the number of sequences used for executing each task is determined.

During the next sequence 311, the quality of control resulting from the degradation of the system is analysed. A step S312 is performed during which the loss of quality of control is compared with the computer resource optimization attained. In other words, it is checked whether the gain in terms of computer resources (for example the number of processor cycles saved) is worth the performance and the robustness loss.

The optimization of the usage of the resources is then analyzed during a sequence 313. It is checked whether the trade-off between the quality of control (QoC) and the processing resources usage resulting from the degradation of the system is satisfying according to criteria depending on the application, the performance and safety specifications the system has to comply with (such information being given by items 303 and 304). A step S314 is performed for verifying the satisfaction of these criteria.

If the trade-off is not satisfactory, then step S308 is performed again and the allocated execution time slots are reduced a little more.

If the trade-off is satisfactory, the final result of the system analysis is validated during sequence 315. A step S316 is performed during which the operation of the system with the allocated execution time slots is tested with non linear models of the system. During this test, the allocated time slots values are confirmed using a representation of the system taking into account saturation and uncertainties issues.

Next, if the system functions satisfactorily, even taking into account these issues, the execution time slots are confirmed for each control task during a step S3017.

In what follows, the WCET (acronym for worst case execution time) issues are presented in details with respect to robustness considerations. The solution proposed by the Inventors is then presented.

Nowadays, many control systems, such as flight control or braking control systems, are considered to be hard real-time, which means that during the design of the systems, it is assumed that control tasks must be executed strictly periodically. Control tasks executions are bounded to fixed time slots, it is not allowed missing a deadline, and jitter is also forbidden (or strictly limited in practice). It is assumed that any deviation from the ideal timing pattern inevitably leads to a failure of the system.

Figure 4:
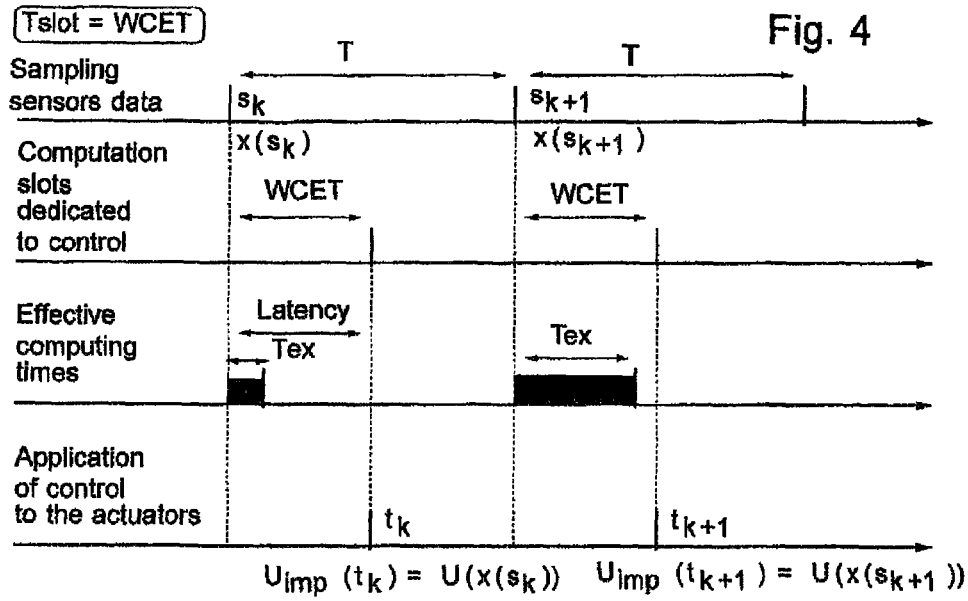
FIG. 4 is an illustration of an exemplary execution schedule of a control task.

The implementation of such control tasks relies on a safe and conservative evaluation of the WCET of each task, which is used to dimension the time slots allocated for the execution of the control tasks. An exemplary execution schedule of a control task is depicted in FIG. 4. For example, the task controls the pitch of an aircraft, based on a pilot's commands and other parameters measured on the aircraft elements.

It is assumed that a given task is executed periodically. A time slot $T_{slot}$ is allocated to the task for its execution. In the exemplary task of FIG. 4 the time slot is first considered to be the WCET. Each time slot is triggered at a period $T=s_k-s_{k-1}$ by the occurrence of measurements $x(s_k)$ at time $s_k$. The measurement may correspond to outputs from sensors of the aircraft (such as speed or pitch sensors) or data accesses (or reading) on communication ports with a cockpit interface.

The computations performed by the control task take a time Tex which is always smaller than the WCET since the WCET corresponds to the worst execution time. In order to avoid output jitter, the control signal $U(x(s_k))$ is applied to the actuators of the aircraft (such as the engines, the hydraulic actuators, the ailerons or the sweep wings) at the end of the time slot, i.e. at time $s_k$+WCET:

for any $t$ such that $s_k WCET \leq t < s_{k+1} WCET$, i.e.

$\forall t \in [s_k + WCET, s_{k+1} + WCET [, U = U(x(s_k))$.

Therefore it is a periodic control system, with a constant period T, subject to a constant delay $T_{slot}$=WCET. This implementation fits well with the hard real-time assumption, and should be applied when the controller is really hard, such as a Finite State Machine which may fail in an unpredicted state if a deadline is missed and a transition is interrupted.

However, as the time slots are allocated based on the WCET of the control tasks, the computations always end before the end of the slot. Therefore a fraction of the computing power is unused, namely the computing time not used between the end of $T_{ex}$ and the end of WCET. The wasted computing power is all the more important as the WCET is far from the average value of the execution time $T_{ex}$ observed during the statistical study of the system for determining the WCET. In particular, due to an increasing demand on services, new control systems are more and more based on distributed architectures and shared off-the-shelf computing devices. However, high computing power are often based on the usage of multiple levels of cache memory and pipe-lines, lowering the determinism of the processors and increasing the difficulty of searching for the program's WCET, which are in fact approached by increasingly conservative upper bounds.

Figure 5:
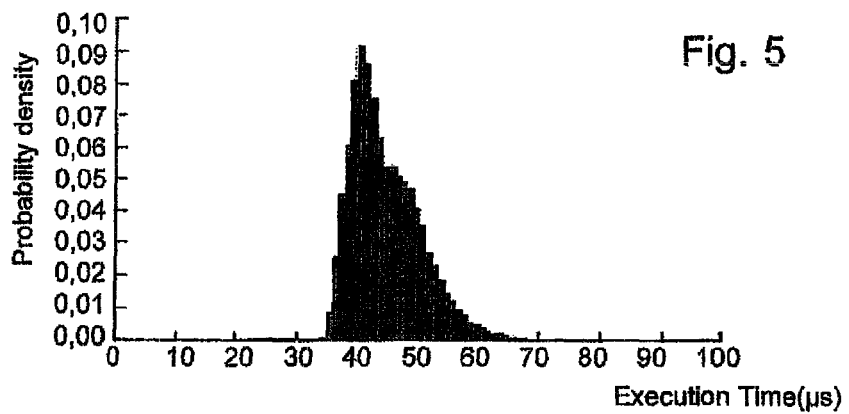
FIG. 5 is an illustration of the repartition of the execution times and the associated probability density for a task to be executed by a system.

FIG. 5 is an illustration of the repartition of the execution times and the associated probability density determined during a preliminary statistical study of the system. In FIG. 5, the execution times concentrate in majority around 40 μs and spread out to other values with a lower probability density. Thus, it appears that the worst case execution time is an extremely infrequent event since its probability is way below the probability of the average execution time. Therefore the amount of wasted computing power is expected to increase with the new generations of control systems, leading to costly over-sizing of embedded computers, power supplies and cooling systems.

That is why the Inventors found it worth to discuss and revisit the widespread "hard real-time" assumption and to examine how it can be weakened, in particular for feedback control systems.

The design of critical systems must satisfy requirements, specifications and certification levels. Robustness is (and must be) a general concern that grows with system complexity. For instance, it is known that small task core execution time modifications in systems with complex performance dependencies can have drastic non-intuitive effects on the overall system performance, and might lead to constraint violations. It is also known that robustness evaluation using simulation is a tedious tasks and practically impossible for the reason that simulation models do not support many of the possible property changes (for instance, increased processor execution times or modified communication volumes).

Robustness in control systems usually deals with the plant's parameters uncertainties, but in the present case the insensitivity or adaptability with respect to timing deviations from the theoretical pattern, such as jitter or missed deadlines, is also investigated. For SISO (single input single output) linear systems robustness can be quantified using phase margins, delay margins and module margins. It appears that a phase margin implies a delay margin (i.e. the maximum and not modelled constant extra delay that can be tolerated before reaching an instability state) and certainly a jitter margin, which is more difficult to quantify but which can be experimentally shown. A feedback control system can be even robust enough to tolerate missed samples, for example in case selective data dropping is applied to lighten the computing and networking burden while preserving closed-loop stability.

In fact, a feedback control system which is robust with respect to the plants parameters uncertainties is also robust, to some extent, with respect to timing deviations. Hence, a feedback control system is not as hard as it is often considered in the literature, but should be better considered as weakly hard, that is to say able to tolerate a predefined amount of timing deviations without leaving its specified performance domain.

Figure 6:
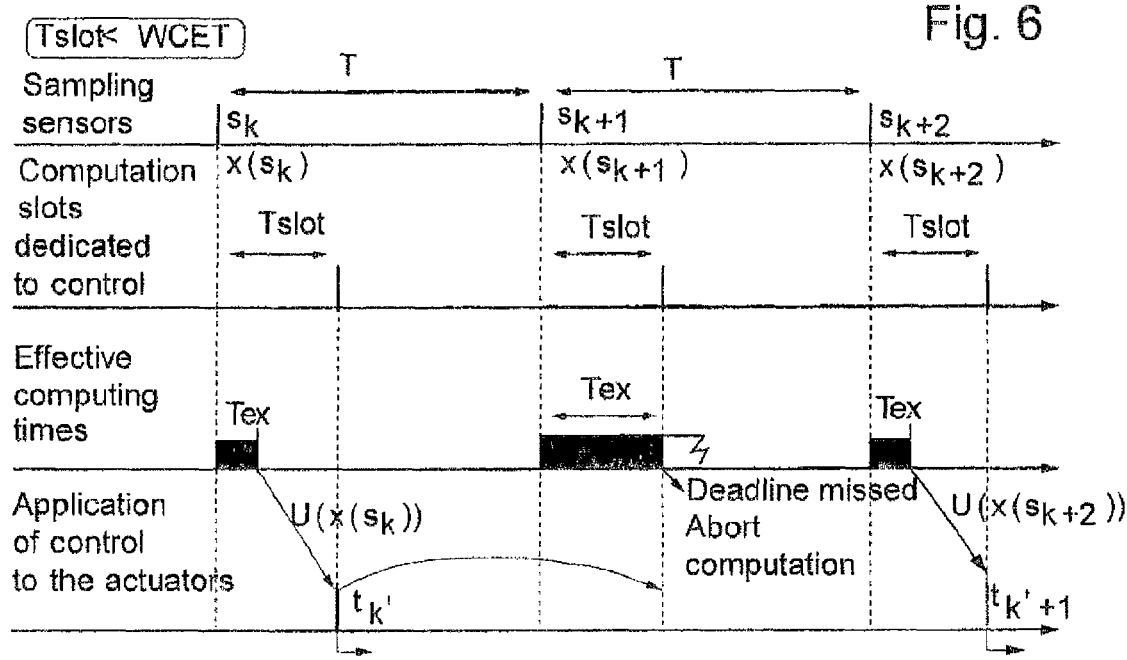
FIG. 6 is an illustration of an execution schedule of a control task according to embodiments.

Therefore, in order to improve the average efficiency of automatic systems, in particular for embedded computers, while preserving the control stability and performance, and relying on the robustness of feedback control laws, there is proposed a control method that weakens the usual real-time constraints as illustrated in FIG. 6.

FIG. 6 takes the same notations as FIG. 4. The measurements occur at a fixed period T, and their occurrences trigger the control tasks. According to the invention, the time slot allocated to a given task is shorter that the WCET, i.e. $T_{slot}$<WCET.

Figure 7:
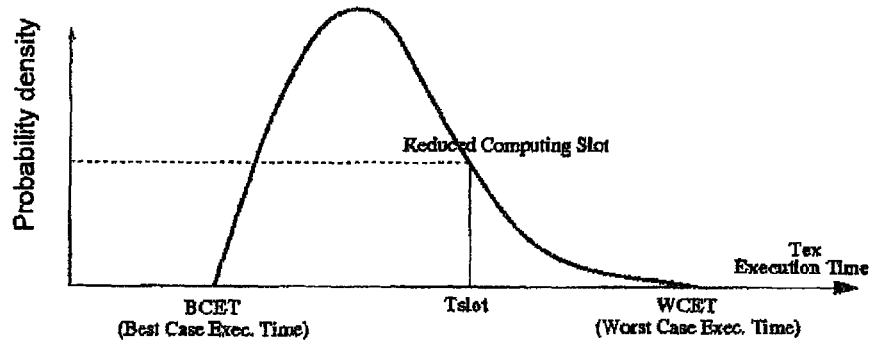
FIG. 7 is an illustration of the selection of a time slot shorter than the WCET.

FIG. 7 is a schematic illustration of the density of probability of the execution times for the system. The time slot value is selected to be shorter than the WCET. A time slot which is close to the WCET induces a small probability of deadlines misses, small disturbances in the controller but also small gains in the computer utilization. Conversely a time slot close to the BCET induces frequent deadlines misses, larger degradations of the control performance but large improvements in the CPU utilization. Moreover it is likely that shortening the time slot increases the control performance and robustness, therefore balancing the degradations induced by the deadlines misses.

Hence, for a given plant's model (including parametric uncertainties), a given control law, and a given execution time probability function, the proposed method aims at finding an adequate value of the time slot which meets a desired trade-off between the CPU utilization and the control performance.

The control signals are sent to the actuators at the end of the time slots, i.e. $U(x(s_k))$ is sent at time $s_k+T_{slot}$, and the delay is equal to $T_{slot}$ $$\forall t \in [s_k+T_{slot}, s_{k+1}+T_{slot}[, U=U(x(s_k)).$$

It may happen that a control task deadline is occasionally missed. In such a case, it is proposed to stop the current computation, hold the current value of the control signal $U(x(s_k))$ for the next period and start a new computation with the next sensor value. The control signal is thus hold for one extra period, i.e. if the deadline is missed at time $s_k+T_{slot}$:

$$\forall t \in [s_k+T_{slot}, s_{k+2}+T_{slot}[, U=U(x(s_k))$$

and for N consecutive missed deadlines and data loss:

$$\forall t \in [s_k+T_{slot}, s_{k+N}+T_{slot}[, U=U(x(s_k)).$$

In other words a newly computed control signal is sent to the actuators at non-equidistant instants $t_{k'}$ only if the control computation has been successfully carried out:

$$t_{k'}=s_k+T_{slot} \text{ if } T_{ex} \leq T_{slot}$$

where k' is a positive integer representing the number of input values which have been implemented before $s_k = kT$. Then, the control input can be asynchronous since the difference between two sampling instant $t_{k'+1}-t_{k'}$ is time-varying but bounded by T and NT. Hence, $t_{k'+1}-t_{k'}=\alpha T$, where the integer $\alpha \in [1, \ldots, N]$ and the asynchronous sampling is determined by the values of T and N.

It is likely that a robust feedback control system can keep stability despite occasional data loss, at the price of a decreased performance and robustness. Therefore, for a given linear time-invariant (LTI) plant, a given control law, a known distribution of execution times of the controller and the weakened real-time constraint, problems to be solved can be informally stated as:
  find N, the maximum value of consecutive data losses due to missed deadlines before losing the closed-loop stability;
  find an adequate value of $T_{slot}$ to fulfil a given trade-off between the control performance and the computing efficiency;
  evaluate the weakly-hard closed-loop robustness with respect to the plant's parameters uncertainties.
In what follows, stability results for systems under uncertainties and input delays are discussed.

A linearized system representing the pitch control of a plane with a sampled and delayed input is considered:

$$\dot{x}(t)=(A+\Delta_\mu A(t))x(t)+(B+\Delta_\mu B(t))u(t), \quad (1)$$

$x \in R^n$ and $u \in R^m$ respectively representing the state variable and the input vector and $\dot{x}(t)$ representing the derivative of x over time. The matrices A and B are constant and of appropriate dimension. The matrices $\Delta_\mu A$ and $\Delta_\mu B$ represent the uncertainties of the model which can be constant or time varying. The (time-varying) uncertainties are given in a polytopic representation:

$$\Delta_\mu A(t)=\mu \Sigma_{i=1}^M \lambda_i(t) A_i,$$

$$\Delta_\mu B(t)=\mu \Sigma_{i=1}^M \lambda_i(t) B_i,$$

where M corresponds to the number of vertices. The matrices $A_i$, $B_i$ and $C_i$ are constant and of appropriate dimension. The scalar $\mu \in R$ characterizes the size of the uncertainties. Note that when $\mu=0$, no uncertainty parameter is disturbing the system. However the greater the value of $\mu$, the greater the disturbances. The functions $\lambda_i(.)$ are weighted scalar functions which follow a convexity property, i.e. for all i=1, M and for all t≥0:

$$\lambda_i(t) \geq 0, \sum_{i=1}^M \lambda_i(t)=1.$$

It is assumed that the control computation induces a constant transmission delay $T_{slot}$ and a sampling of the transmitted signal. As mentioned above, the control law is a piecewise-constant static state-feedback of the form:

$$u(t)=Kx(t_{k'}-T_{slot}), t_{k'} \leq t < t_{k'+1},$$

where the gain K in $R^{n \times m}$ is given.

These instants $t_{k'}$ represent the instants where the control input is updated. The closed loop system is thus rewritten as $$\forall t \in [t_{k'}, t_{k'+1}], \dot{x}(t)=\overline{A}(t)x(t)+\overline{B}(t)Kx(t_{k'}-T_{slot}) \quad (2)$$

where $\overline{A}(t)=A+\Delta_\mu A(t)$ and $\overline{B}(t)=B+\Delta_\mu B(t)$. Several authors investigated in guaranteeing the stability of such systems. A continuous-time approach to model sampled-data systems allowing assimilating sampling effects as the ones of a particular delay or aggregating delay formulation has been investigated. They develop stability criteria which take into account the delay δ. However they did not consider the different natures of the transmission and the sampling delay. More especially the additional characteristic of sampled delay which is δ=1 has not been included and thus leads to conservative conditions.

When $\mu$ is zero, the discrete-time modelling of such systems is obtained by integrating the differential equation (2) over the interval $[t_{k'}, t_{k'}+\overline{T}]$, for any $\tau$ in $[0, \overline{T}]$, $$x(t_{k'}+\tau)=\tilde{A}(\tau)x(t_{k'})+\tilde{B}(\tau)Kx(t_{k'}-T_{slot}), \tilde{A}(\tau)= e^{A\tau}, \tilde{B}(\tau)=\int_0^\tau e^{A(\tau-\theta)}d\theta B. \quad (3)$$

This equality leads to the introduction of a new notation. Define, for all integer k', the function $X_{k'}^{T_{slot}}: [0,NT] \times [-T_{slot}, 0] \to R^n$ such that for all $\tau$ in a[0, NT] and all $\theta$ in $[-T_{slot}, 0]$, $X_{k'}(\tau, \theta)=x(t_{k'}+\tau+\theta)$. The set $K_{NT}^{T_{slot}}$ represents the set of functions defined by $X_{k'}^{T_{slot}}$ as the set of continuous functions from $[0, NT] \times [-T_{slot}, 0]$ to $R^n$.

However, the same discretization method is not valid when the system is subject to time-varying uncertainties. Thus discrete-time analysis of (3) leads to unavoidable difficulties. Thus there is a need for a novel stability conditions to cope with this type of discrete-time systems.

The stability of systems subject to varying sampling, constant delay and time-varying uncertainties has thus to be assessed. The main idea is to consider separately the two types of delays. To do so, the stability conditions are based on the discrete-time Lyapunov Theorem but expressed with the continuous-time model of the system. It leads to less conservative necessary conditions.

In what follows, there is provided new stability conditions for systems submitted to uncertainties, delays and varying sampling.

Since the problem of sampled-data systems is at the boundary of the discrete and the continuous-time theories, the difference between the discrete and continuous-time Lyapunov Theorems is presented. In particular, there is presented a new stability criterion for systems, taken in a continuous-time model, using the discrete-time Lyapunov Theorem.

Theorem 1: Consider N, a positive integer. Let V: $K^{Tslot} \to R^+$ be a differentiable functional, for which there exist real numbers $0 < \mu_1 \leq \mu_2$ and $p > 0$ such that $$\forall (x_t) \in K, \mu_1 |x_t(0)|^p \leq V(x_t) \leq \mu_2 |x_t|^p. \quad (4)$$

The two following statements are equivalent.
(i) $\forall k' \geq 0$, $\Delta V(k) = V(x_{t_{k+1}}) - V(x_{t_k}) < 0$;
(ii) There exists a continuous functional V: $R \times K_T^{slot} \to R$, differentiable over the sampling intervals of the form $[t_{k'}, t_{k'+1}[$ which satisfies, for all $k \geq 0$ and $Y \in [T, NT]$ $$V(Y, X_k^{Tslot}) = V(0, X_k^{Tslot}). \quad (5)$$

and such that, for all $k > 0$ and for all $\tau$ in $[0, Y]$, the following inequality holds $$\dot{W}(\tau, X_k^{Tslot}) < 0, \quad (6)$$

where $\tau = \tau(t) = t - t_k'$ and $$\dot{W}(\tau, \chi_k^{Tslot}) = \frac{d}{dt}\{[V(x_t) + v(\tau, \chi_k^{Tslot})]\}.$$

Moreover, if one of these two statements is satisfied, the solutions of system (2) are asymptotically stable.

The main idea remains in showing the equivalence between the conditions on the decreasing increment $V(k) = V(x_{t_{k+1}}) - V(x_{t_k}) < 0$ and the existence of a continuous functional which coincides with the Lyapunov function at the sampling instants and which is strictly decreasing within all sampling intervals. The main contribution of Theorem 1 is that the introduction of the functional W allows the Lyapunov-Krasovskii functional V to be locally increasing. For the sake of simplicity, the notation $\tau$, stand for the time-varying sampling delay Here, a study on the asymptotic stability of the solutions of sampled-data systems presented in (1) with $\mu = 0$ is provided. The objective is to design a functional which satisfies the conditions proposed in Theorem 1.

Theorem 2: Consider an integer N and two non negative scalars $T_{slot}$ and T. Assume that there exist $Q > 0$, $R_1 > 0$ and $R_2 > 0 \in S^n$, $P > 0$, $U > 0$ and $S_1 \in S^{2n}$ and three matrices $S_2$ and $X \in R^{2n \times 2n}$, $Y \in R^{5n \times 2n}$ that satisfy for $j = 1, 2$:

$$\Psi_1(A, B) = \Pi_1(T_{slot}) + T_j \Pi_2 + T_j \Pi_3 < 0, \quad (7)$$

$$\Psi_2(A, B) \begin{bmatrix} \Pi_1(T_{slot}) - T_j \Pi_3 & T_j Y \\ T_j Y^T & -T_j U \end{bmatrix} < 0, \quad (8)$$

where $T_1 = T$, $T_2 = NT$ and
$\Pi_1(T_{slot}) = 2He\{N_1^T PN_0\} + M_1^T QM_1 -$
$\quad M_2^T QM_2 + M_0^T(R_1 + T_{slot}R_2)M_0 - M_{12}^T R_2/T_{slot}M_{12} -$
$\quad M_5^T R_1 M_5 - N_{12}^T S_1 N_{12} - 2He\{YN_{12}\} - 2He\{N_2^T S_2 N_{12}\}$
$\Pi_2 = N_0^T UN_0 + 2He\{N_0^T(S_1 N_{12} + S_2^T N_2)\},$
$\Pi_3 = N_2^T XN_2$
and
$M_0 = [A\ 0\ 0\ BK\ 0],$
$M_1 = [I\ 0\ 0\ 0\ 0],$
$M_2 = [0\ I\ 0\ 0\ 0],$
$M_3 = [0\ 0\ I\ 0\ 0],$
$M_4 = [0\ 0\ 0\ I\ 0],$
$M_5 = [0\ 0\ 0\ 0\ I]$
$N_0 = [M_0^T\ M_5^T]^T,$
$N_1 = [M_1^T\ M_2^T]^T,$
$N_2 = [M_3^T\ M_4^T]^T,$
$M_{12} = M_1 - M_2,$
$N_{12} = N_1 - N_2$ System (2) is thus asymptotically stable for any asynchronous sampling defined by (T, N) and the delay $T_{slot}$.

Proof: consider the functional:

$$V(t, x_t, \dot{x}_t) = y^T(t)Py(t) + \int_{t-T_{slot}}^{t} x^T(x)Qx(s)ds + \int_{t-T}^{t} \cdots \quad (9)$$

$$\dot{x}^T(x)(R_1 + (T_{slot} - t + s)R_2)\dot{x}(s)ds$$

where $y(t) = [x^T(t)x^T(t-T_{slot})]^T$. Note that V corresponds to a classical Lyapunov-Krasovskii functional type to cope with the stability of constant time-delay systems. The objective is here to ensure that the variation of V between two successive sampling instants is negative. This means that $\Delta V = V(t_{k'+1}, x_{t_{k'+1}}, \dot{x}_{t_{k'+1}}) - V(t_{k'}, x_{t_{k'}}, \dot{x}_{t_{k'}})$ is definite negative for all positive integer k'. For any integer k', the sampling length is denoted $Y_{k'} = t_{k'+1} - t_{k'}$. Consider the additional functional $$v(t, \chi_k^{Tslot}) = (Y_{k'} - \tau)\zeta_0^T(t)[S_1\zeta_0(t) + 2S_2 y(t_k)] + \quad (10)$$

$$(Y_{k'} - \tau)\int_{t_k}^{t} \dot{y}^T(s)U\dot{y}(s)ds + (Y_{k'} - \tau)\tau y^T(t_k)Xy(t_k),$$

where $\zeta_0(t) = y(t) - y(t_k)$, $\xi(s) = [y^T(s)y^T(t_k)\dot{x}^T(s - T_{slot})]^T$.

Note that the conditions from Theorem 2 include the robust stability properties with respect to the input delay $T_{slot}$. This means that (7) and (8) require the system to be stable at least for the transmission delay $T_{slot}$ and $T = T_i$.

Now we consider $\mu \neq 0$. It is intended to extend the previous theorem to the case of time-varying uncertainties. In the previous stability theorem, the conditions depend almost linearly on the matrices defining the continuous-time model. Then the following corollary presents an extension of the previous theorem to uncertain and time-varying model.

Corollary 1: Consider an integer N and there non negative scalars $T_{slot}$, T and $\mu$. Assume that there exist $Q > 0$, $R_1 > 0$ and $R_2 > 0 \in S^n$, $P > 0$, $U > 0$ and $S_1 \in S^{2n}$ and three matrices $S_2$ and $X_1 \in R^{2n \times 2n}$, $Y \in R^{5n \times 2n}$ that that satisfy, for $i = 1, \ldots, M$ and $j = 1, 2$ $$\Psi_{1i}(A_i, B_i) = \Pi_{1i}(T_{slot}) + T_j \Pi_{2i} + T_j \Pi_{3i} < 0, \quad (11)$$

$$\Psi_{2i}(A_i, B_i) = \begin{bmatrix} \Pi_{1i}(T_{slot}) - T_j \Pi_{3i} & T_j Y_i \\ T_j Y_i^T & -T_j U \end{bmatrix} < 0, \quad (12)$$

where
$\Pi_{1i}(T_{slot}) = 2He\{N_1^T PN_{0i}\} + M_1^T QM_1 -$
$\quad M_2^T QM_2 + M_{0i}^T(R_1 + T_{slot}R_2)M_{0i} - M_{12}^T R_2/T_{slot}M_{12} -$
$\quad M_5^T R_1 M_5 - N_{12}^T S_1 N_{12} - 2He\{Y_i N_{12}\} - 2He\{N_2^T S_2 N_{12}\}$
$\Pi_{2i} = N_{0i}^T UN_{0i} + 2He\{N_{0i}^T(S_1 N_{12} + S_2^T N_2)\},$
$\Pi_{3i} = N_2^T X_i N_2$
and
$M_{0i} = [A_i\ 0\ 0\ B_i K\ 0],$
$N_{0i} = [M_{0i}^T\ M_5^T]^T,$
$A_i = A + \mu A_i$
$B_i = B + \mu B_i$ System (2) is thus asymptotically stable for the periodic sampling defined by T and the delay $T_{slot}$.

Proof: Consider the stability conditions from Theorem 2. By noting that $M_0(t) = [\bar{A}(t)\ 0\ 0\ \bar{B}(t)K\ 0] = \Sigma_{i=1}^M \lambda_i(t)M_{0i}$ $N_0(t) = [M_0^T(t)M_5^T] = \Sigma_{i=1}^M \lambda_i(t)N_{0i}$ and by introducing the matrices variables $$Y(t) = \sum_{i=1}^{M} \lambda_i(t) Y_i$$

$$X(t) = \sum_{i=1}^{M} \lambda_i(t) X_i$$

most of the terms defined in $\Psi_1(\overline{A}(t), \overline{B}(t))$ and $\Psi_2(\overline{A}(t), \overline{B}(t))$ are linear with respect to the time-varying terms.

However the terms $M_0^T(t)(R_1 + T_{slot} R_2) M_0(t)$ and $N_0^T(t) U N_0(t)$ are still not linear with respect to the matrices $M_0(t)$ and $N_0(t)$. However the Schur complement allows obtaining expressions which become linear with respect to these two time-varying matrices. Then this proves that $$\Psi_1(\overline{A}(t), \overline{B}(t)) = \sum_{i=1}^{M} \lambda_i(t) \Psi_{1i}(A_i, B_i),$$

$$\Psi_2(\overline{A}(t), \overline{B}(t)) = \sum_{i=1}^{M} \lambda_i(t) \Psi_{2i}(A_i, B_i)$$

Then if all the linear matrix inequalities (LMI) $\psi_{1i}(A_i, B_i)$ and $\psi_{2i}(A_i, B_i)$ are satisfied for $i=1, \ldots, M$, then the conditions of Theorem 2 are also verified for the time-varying system (1).

In what follows, the methodology described above is applied to an exemplary study of the pitch control of an F-16 aircraft.

The case study applies the application of the robustness approach described above to a weakened scheduling scheme for the pitch controller of an aircraft. In the present example, we only consider the so-called "short period approximation" linearized model of an aircraft around the pitch axis. This model may be given by a state equation:

$$\begin{cases} E\dot{x} = Fx + Gu \\ y = Hx \end{cases} \quad (13)$$

The state vector is $x = [\alpha \ \theta \ q]$ and the input vector is $u = \delta_E$ where
  $\alpha$ is the angle of attack
  $\theta$ is the pitch angle
  $q$ is the pitch rate.
  $\delta_E$ is the elevator deflection
The transition, control and observation matrices are respectively given by:

$$E = \begin{bmatrix} V_T - Z_\alpha & 0 & 0 \\ 0 & 1 & 0 \\ -M_{\dot{\alpha}} & 0 & 1 \end{bmatrix}, \quad (14)$$

$$F = \begin{bmatrix} Z_\alpha & -g_0' \sin\gamma_e & V_T + Z_q \\ 0 & 0 & 1 \\ M_\alpha & 0 & M_q \end{bmatrix},$$

$$G = \begin{bmatrix} Z_{\delta_e} \\ 0 \\ M_{\delta_e} \end{bmatrix},$$

$$H = \begin{bmatrix} 0 & 0 & 180/\pi \\ 0 & 180/\pi & 0 & 0 \end{bmatrix},$$

where matrix E is always non-singular in normal flight conditions. The model parameters ($V_T, Z_\alpha, Z_\delta, g_0, M_\alpha, M_\delta, \gamma_e, Z_q, M_q, Z_{\delta_e}, M_{\delta_e}$) are the dimensionless derivatives of the standard aircraft which may be found in B. L. Stevens and F. L. Lewis, *Aircraft Control and Simulation*. Wiley-Interscience, 2003.

Figure 8:
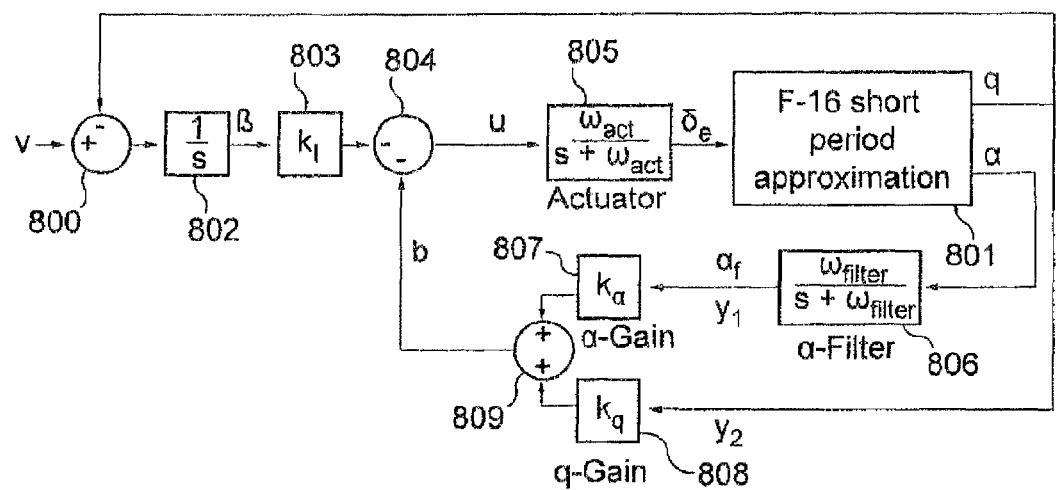
FIG. 8 is a block diagram of a pitch control system of an F-16 aircraft.

FIG. 8 is a block-diagram of the pitch control system. A reference signal r is fed to the system and is compared by a comparator 800 with a signal q output by a module 801 representing the model of the F-16 aircraft. The output of the comparator 800 is then fed to an integrator unit 802 the output of which $\beta$ is fed to a gain ($k_1$) unit 803. Indeed, state-of-the-art pitch control design takes into account the elevator's dynamics, and an integrator is added in the feed-forward channel to ensure a zero steady-state error.

The output of the gain unit 803 if fed along with a signal b described hereafter to a summing and inverting unit 804. The output of unit 804 is signal u and is fed to the unit 805 representing the actuators of the aircraft with a first order transfer function. The output $\delta_E$ of the unit 805 is fed to unit 801.

Unit 801 outputs signals q and $\alpha$. The noisy angle of attack $\alpha$ is fed to a low-pass filter unit 806 the output of which is fed to a gain ($k_\alpha$) unit 807. Signal q is fed to a gain ($k_q$) unit 808. The output signals from the gain units 807 and 808 are fed to a summing unit 809 the output of which is signal b.

The full controlled plant has an augmented state vector given by [$\alpha$ q $\delta_E$ $\alpha_F$ $\beta$] where $\alpha_F$ is the filtered measure of $\alpha$ and 13 is the output of the integrator. We can then obtain standard state space equation of the form:

$$\begin{cases} \dot{x} = Ax + Bu \\ y = Cx \end{cases} \quad (15)$$

where $$A = E^{-1}F \text{ and } B = E^{-1}G.$$

where
$A = E^{-1}F$ and $B = E^{-1}G$. The augmented system has the structure and dimensions instantiated, e.g., in system (16).

In our case study, we have considered the F-16 aircraft with the flight conditions given in table I below:

| Variable | Nominal | $x_{cg} = 0.3\bar{c}$ | $x_{cg} = 0.38\bar{c}$ |
|---|---|---|---|
| $V_T$ (ft/s) | 502.0 | 502.0 | 502.0 |
| $\alpha$ (rad) | 0.03691 | 0.03936 | 0.03544 |
| $\theta$ (rad) | 0.03936 | 0.03936 | 0.03544 |
| q (rad/s) | 0 | 0 | 0 |
| Thtl (0-1) | 0.1385 | 0.1485 | 0.1325 |
| $\delta_E$ (deg) | -0.7588 | -1.931 | -0.05590 |

The nominal condition is: h=0ft, $x_{cg}=0.35\bar{c}$, $\dot{\theta}$, h being the altitude, $x_{cg}$ is the centre of gravity location in fraction of $\bar{c}$ which is the mean aerodynamic chord of the aircraft. Using the nominal condition and a flight at sea level, we obtain the following numerical values for the pitch model:

$$A = \begin{bmatrix} -1.01887 & 0.90506 & -0.00215 & 0 & 0 \\ 0.82225 & -1.07741 & -0.17555 & 0 & 0 \\ 0 & 0 & -20.2 & 0 & 0 \\ 10.0 & 0 & 0 & -10 & 0 \\ 0 & -57.2958 & 0 & 0 & 0 \end{bmatrix} \quad (16)$$

$$B = \begin{bmatrix} 0 \\ 0 \\ 20.2 \\ 0 \\ 0 \end{bmatrix},$$

$$C = \begin{bmatrix} 0 & 0 & 0 & 57.2958 & 0 \\ 0 & 57.2958 & 0 & 0 & 0 \\ 0 & 0 & 0 & 0 & 1 \end{bmatrix}.$$

An output feedback controller $u=Ky=-k_\alpha \alpha_F - k_q q - k_i \beta$ is designed using standard pole placement giving $K=[-0.04238; -0.4098; 0.8426]$. The control period is chosen as $T=0.08$ sec, and the nominal computing slot is chosen as WCET=0.02 sec (considering that the CPU is shared by four control tasks). The matrices $A_i$ and $B_i$, elements of the convex combination $\Delta_\mu A(t)$ and $\Delta_\mu B(t)$ are defined in a simple 2 vertices polytope as for i=1, 2 $A_i=(-1)^i A$ and $B_i=(-1)^i B$.

Figure 9:
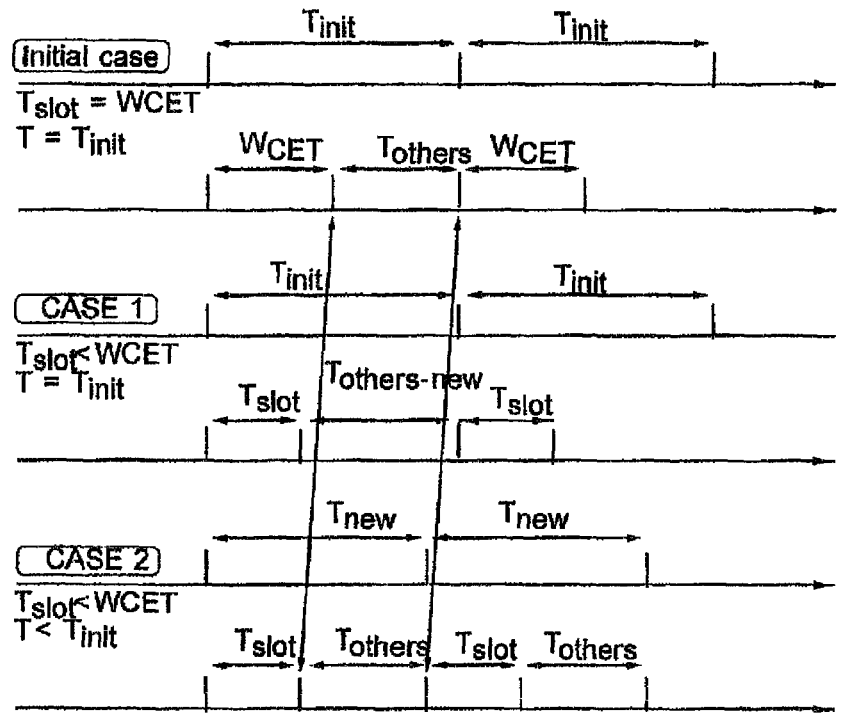
FIG. 9 is an illustration of an execution schedule of a control task for a case study.

Starting from the initial 'hard real-time' pattern described in FIG. 4, where a WCET time slot is allocated to the control task with a period T, two weakened scheduling scheme, illustrated in FIG. 9, have been considered.

In the first case (Case 1), a time slot $T_{slot}<$WCET is allocated to the control task, but the system's period T keeps its initial value of FIG. 4. In that case some extra time remains to compute other activities between the end of $T_{slot}$ and the new control activation, i.e. $T_{others\_new}=T_{others}+(\text{WCET}-T_{slot})$. Some control improvement results from the reduction of the latency from WCET to $T_{slot}$.

In the second case (Case 2), a time slot $T_{slot}<$WCET is allocated to the control task, but the system's period is now also reduced by the same value, i.e. $T_{new}=T-(\text{WCET}-T_{slot})$, while the time remaining for computing other activities remains $T_{others}$ as in the initial scheme of FIG. 4. In that case control improvement results from both the latency and sampling period reduction.

The stability conditions of Theorem 2 are used to find the relations between the computing slot value (given by the ratio $$\epsilon = \frac{T_{slot}}{WCET}$$

and the maximum number of consecutive missed deadlines before instability N, for the two cases and for several values of the uncertainty multiplier μ. As already discussed above, the uncertainty multiplier models the uncertainties concerning the parameters of the system. For example, during the flight, the mass, the speed of the aircraft cannot be measured ideally. Therefore, an uncertainty parameter is introduced to reflect the uncontrolled phenomena acting on the parameters. This parameter may also take into account the non-linear behaviour of the real system which has not been introduced during the model linearization.

Figure 10:
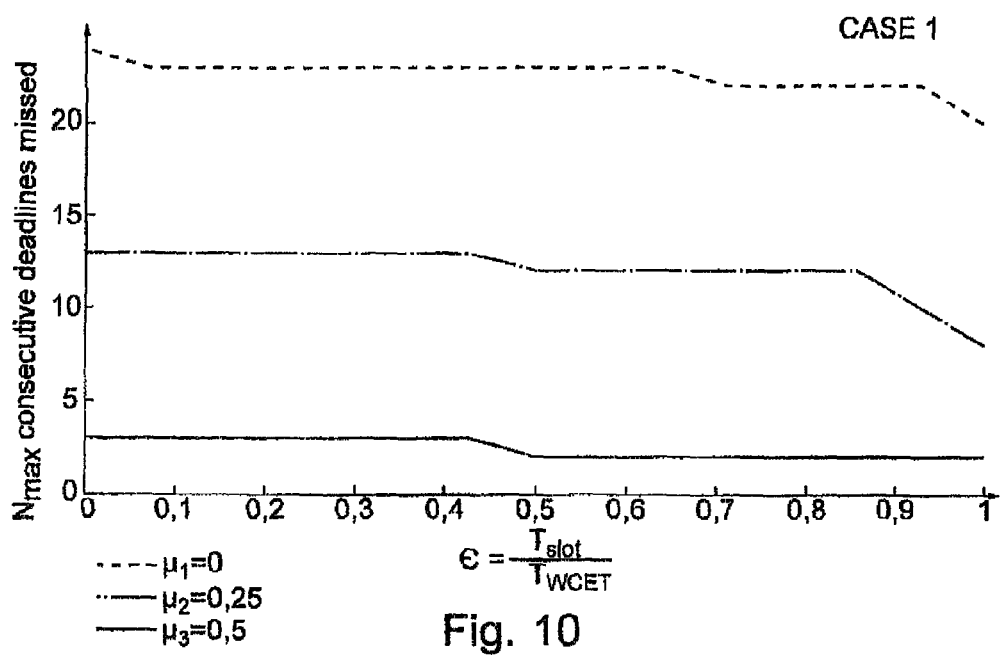
FIGS. 10-13, 14a-14b and 15a-15b are graphs showing case study results.

The results of the analysis of Case 1, illustrated in FIG. 10, show that the tolerance of the feedback controller with respect to missed deadlines, measured by N, increases when $T_{slot}$ is decreased (therefore also decreasing the systematic latency). It also shows that increasingly uncertain systems, with growing values of μ (referenced as $\mu_1$, $\mu_2$ and $\mu_3$), are less tolerant with respect to missed deadlines.

Figure 11:
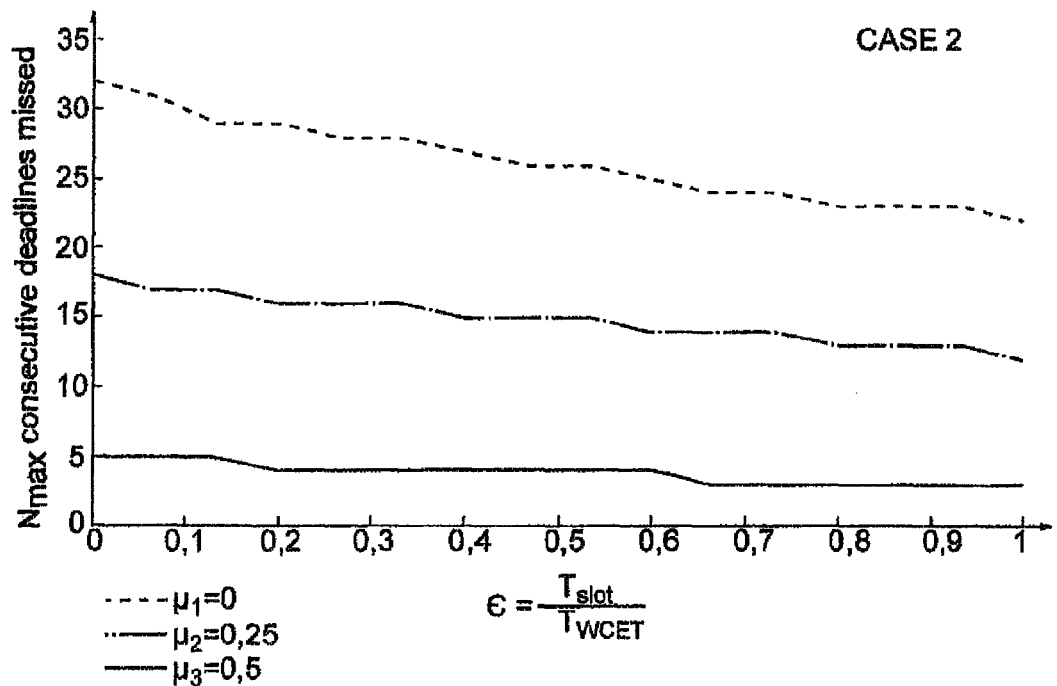

The results for Case 2 are illustrated in FIG. 11. The number N of sustainable consecutive missed deadlines is even improved, as the reduction of $T_{slot}$ induces a decreasing in both the delay and the sampling interval.

Figure 12:
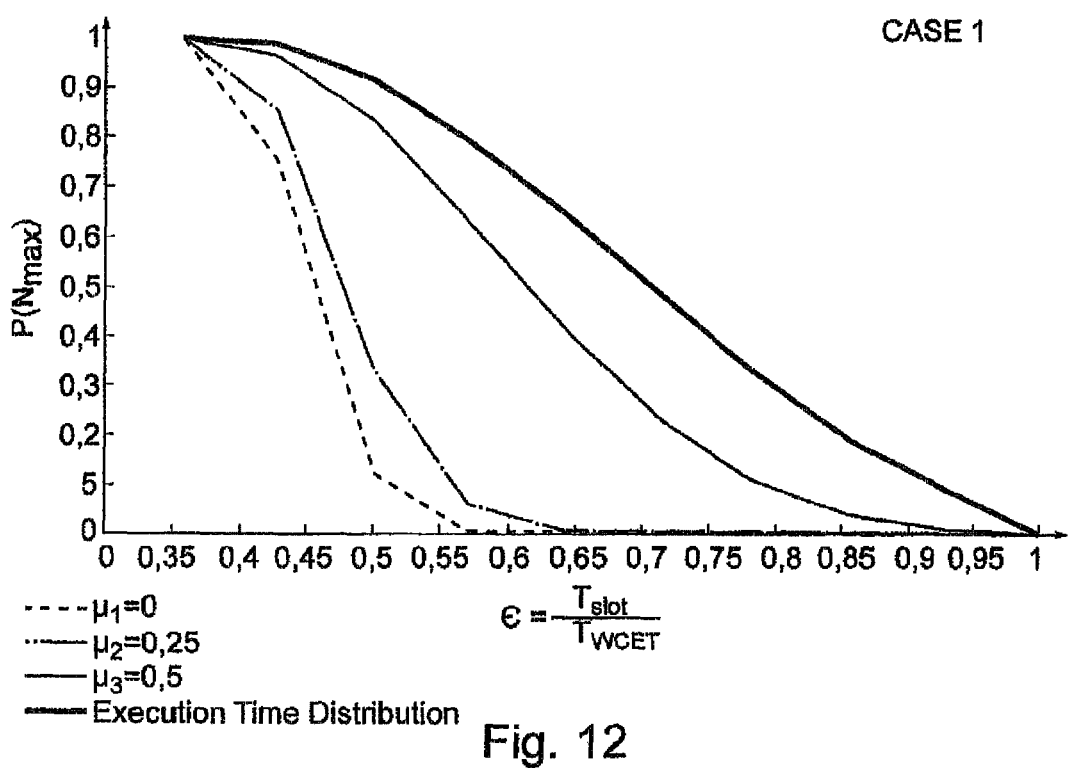
Figure 13:
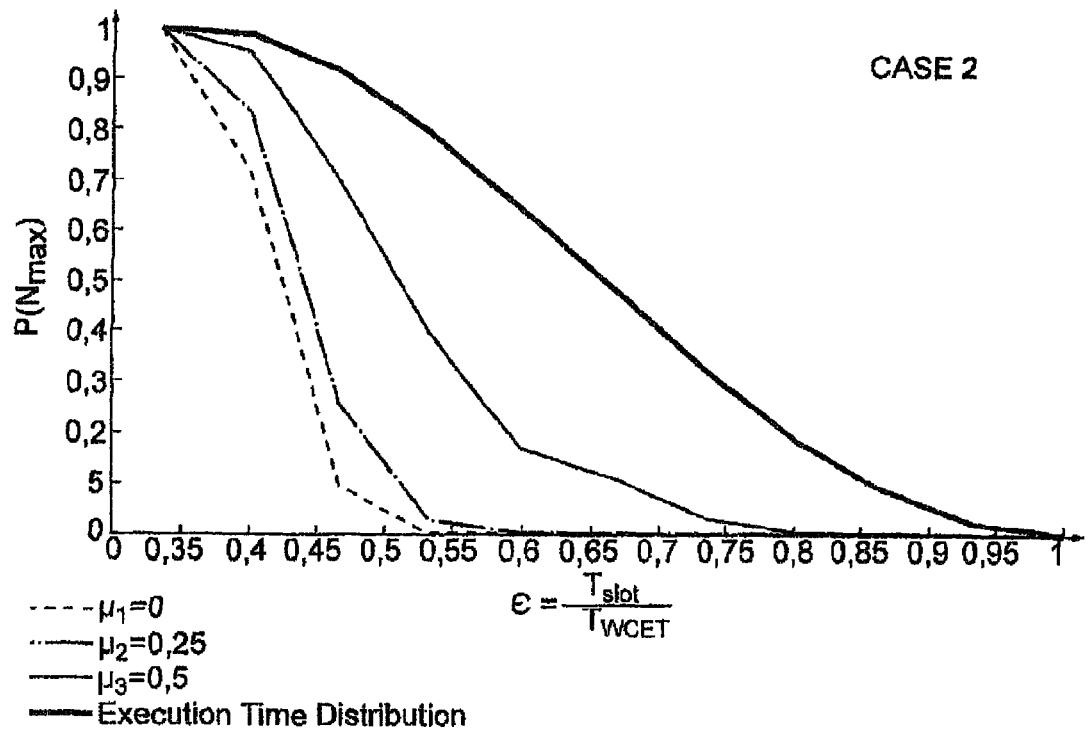

Nevertheless, decreasing $T_{slot}$ increases the risk of missing deadlines. For a given distribution of execution times of the control task, the probability of missing deadlines decreases from 1 to 0 as the scheduling factor $$\epsilon = \frac{T_{slot}}{WCET}$$

decreases from 1 ($T_{slot}$=WCET) to a minimum value where $T_{slot}$=BCET (Best Case Execution Time), as represented by the bold curve in FIGS. 12 and 13 respectively corresponding to the results for Case 1 and Case 2. Assuming that the execution times of the task instances are independent, the probability of reaching the maximum tolerable number of consecutive missed deadlines are given in the same FIGS. 12 and 13 for the two scheduling cases and for different values of the uncertainty μ. Hence, for a given scheduling scheme and uncertainty assumption, it is possible to compute the $$\epsilon = \frac{T_{slot}}{WCET}$$

scheduling factor corresponding at a given failure probability, e.g. requested by some certification process.

It is thus possible to refine the execution time and let the system go at a given pace as long as the system's stability is mathematically guaranteed (and also numerically using the LMI's based on the theorems for large-order systems). The system analysis allows evaluating the probability of keeping the system stable by evaluating the probability of reaching the maximum tolerable number of consecutive missed deadlines for each value of ε. The system designer may thus determine a trade-off between Quality of Control, level of fault tolerance and the system's safety.

Figure 14A:
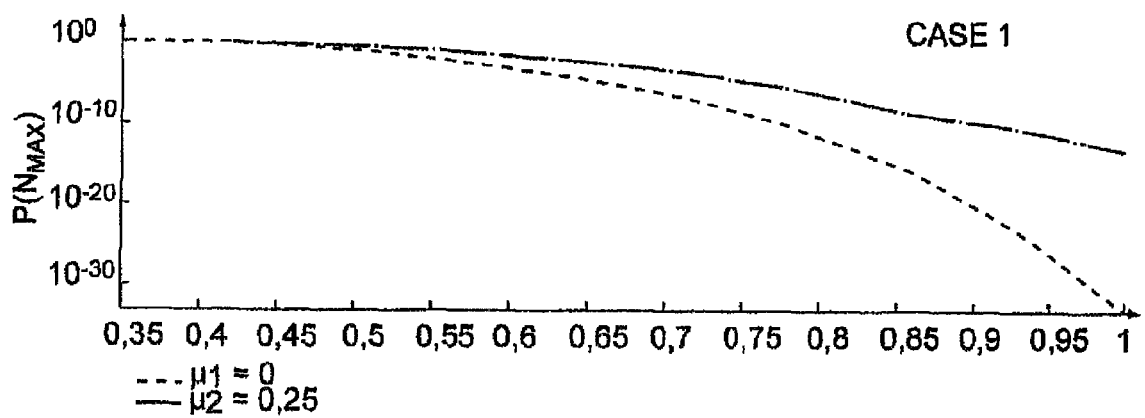
Figure 14B:
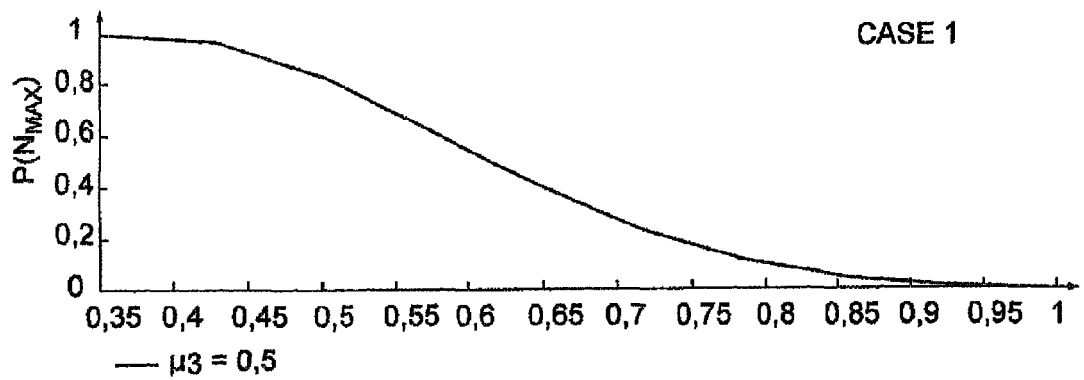

FIGS. 14a and 14b are logarithmic views of the graph in FIG. 12

Figure 15A:
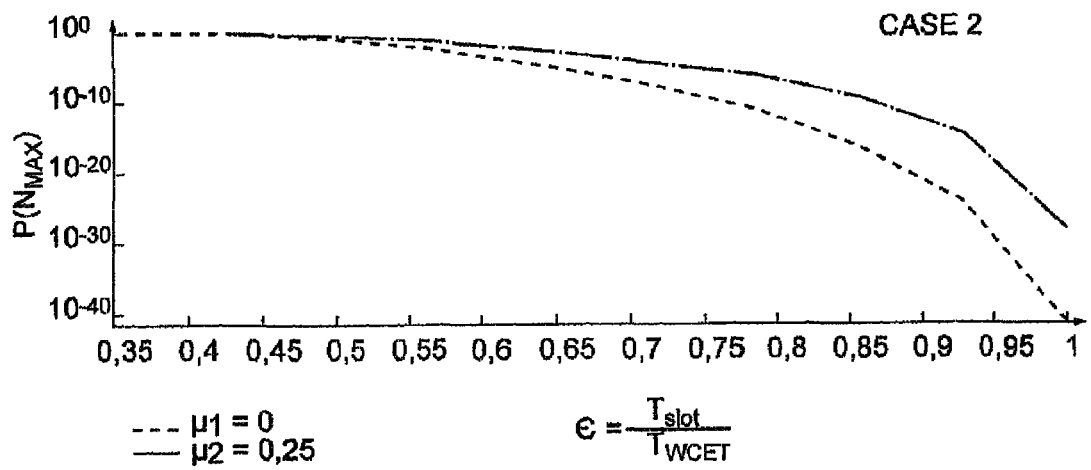
Figure 15B:
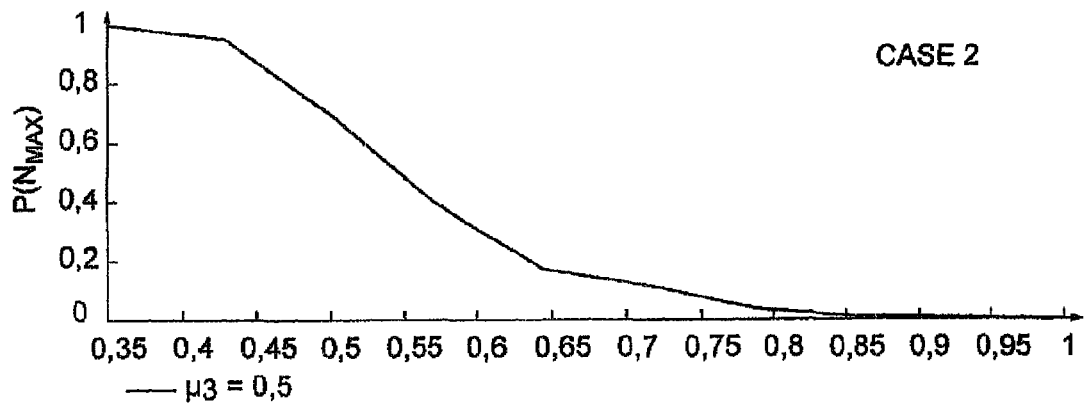

(Case 1) showing the evolution of the probability for μ1 and μ2 (FIG. 14a) and for μ3 (FIG. 14b). FIGS. 15a and 15b are logarithmic views of the graph in FIG. 13 (Case 2) showing the evolution of the probability for μ1 and μ2 (FIG. 15a) and for μ3 (FIG. 15b). The trade-off is likely to be found when ε is larger than 0.5, since for E below 0.5 $P(N_{max})$ is high. Indeed, the curves in FIGS. 14a, 14b and 15a, 15b show that probability of reaching the maximum tolerable number of consecutive missed deadlines is in the range of $10^{-9}$. For example, when $\mu=\mu_2=0.25$ and $\epsilon=0.857$, $P(N_{max})=2.35 \cdot 10^{-9}$.

The Inventors have thus shown that the hard real-time assumption upon which most critical control systems are implemented in the prior art can be revisited based on robustness considerations. They have provided new stability conditions for feedback linear systems submitted to delays, varying sampling and uncertainties.

When implemented under a weakened scheduling scheme, it happens that a control task misses its deadline. In that case the computation is aborted and the preceding control signal is hold for an extra control period, therefore leading to a varying sampling system.

In this framework the new stability condition allows for computing the maximum number of consecutive missed deadlines which can be tolerated by an uncertain system while keeping stability, considering a given scheduling factor.

The Inventors have thus provided a basis for system designers for design and implementation rules for finding cost effective trade-offs between embedded computing power, control performance, control robustness and overall fault-tolerance.

A computer program according to embodiments may be designed based on the flowchart of FIG. 2 and the present description.

Figure 16:
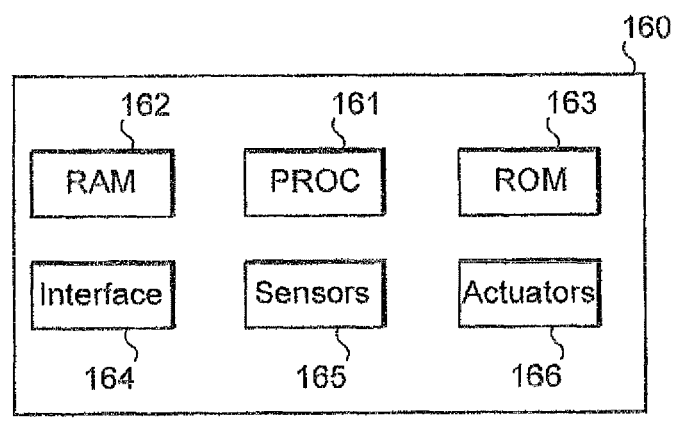
FIG. 16 is a schematic illustration of a system according to embodiments.

FIG. 16 is a schematic illustration of a system 160 according to embodiments. The system comprises a RAM (Random Access Memory) unit 162 for storing processing data used for computations for implementing a method according to embodiments. The system may also comprise a ROM (Read Only Memory) unit 163 for storing a computer program according to an embodiment. The system further comprises a control unit 161. The control unit may comprise a processor configured for implementing a method according to an embodiment, for example by executing instructions of a computer program according to embodiments. The computer program may be stored in and loaded from the ROM unit 163. The control unit may also comprise other processors dedicated to the execution of tasks of the system. Some of the processor may be main processors used during the normal execution of the tasks and some of the processors may be auxiliary processors used in case of a failure of one or several main processors.

The system also comprises an interface unit 164 for receiving commands from a user (such as a pilot) or from a command system (such as a cockpit lever). The system further comprises a sensing unit 165 with a set of sensors (such as a speed sensor or a pitch sensor) for performing measurements used for the control of the system by the control unit and an actuating unit 166 comprising actuators (such as ailerons or engines) for performing actions controlled by the control unit.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

In particular, the present invention is not limited to avionics systems. The present invention may have other applications in control systems for a power plant, a chemical reactor, for an automobile or in other fields.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method of controlling a system comprising the following steps:
    allocating a time slot to the executing of a task relating to control of said system;
    launching the task relating to control of said system, said task being associated with a worst case execution time and for producing a result for controlling said system; and
    monitoring whether execution of the task is completed during the time slot allocated to the execution of the task to determine whether said task has produced said result within said time slot for controlling said system,
    wherein said time slot is shorter than said worst case execution time.

2. A method according to claim 1 wherein said task is launched periodically according to a fixed period of time.

3. A method according to claim 2 wherein when the execution of the task is completed during the allocated time slot, the method further comprises outputting an output value based on said result calculated based on a current input value.

4. A method according to claim 2 wherein when the execution of the task is not completed during the allocated time slot, the method further comprises outputting an output value calculated based on a previous input value.

5. A method according to claim 4 further comprising stopping the task and launching the task again at the next period of time with a next input value.

6. A method according to claim 1 wherein a duration of the time slot is previously set so that a statistical maximum number of consecutive launches of the task that are longer than said duration is below a performance threshold.

7. A method according to claim 1 wherein the time slot is determined so that a probability for reaching a maximum number of consecutive tasks that are not completed during the time slot is below a performance threshold.

8. A method according to claim 1 wherein the system has a feedback loop.

9. A method according to claim 1 wherein the task corresponds to an instance of a computer program.

10. A method according to claim 1 wherein the task corresponds to a command of an actuator of the system.

11. A computer program stored on a non-transitory computer-readable storage medium so as to be structurally and functionally interrelated to the medium and permit the following operations to be realized:
    allocating a time slot to the executing of a task relating to control of said system;
    launching the task, said task being associated with a worst case execution time and producing a result for controlling said system; and
    monitoring whether execution of the task is completed during the time slot allocated to the execution of the task to determine whether said task has produced said result within said time slot for controlling said system,
    wherein said time slot is shorter than said worst case execution time.

12. A system comprising a processor configured to carry out the method according to claim 1.

13. Aircraft command system comprising a system according to claim 12.

14. Aircraft comprising a system according to claim 12.

* * * * *